United States Patent [19]
Duwe

[11] 3,909,056
[45] Sept. 30, 1975

[54] SHEET HANDLING EQUIPMENT

[76] Inventor: Robert Christian Duwe, The Hollies, Ford Lane, Northenden, Manchester 22, Lancashire, England

[22] Filed: Mar. 13, 1974

[21] Appl. No.: 450,568

[30] Foreign Application Priority Data
Mar. 17, 1973 United Kingdom............... 12951/73

[52] U.S. Cl. ............ 294/67 BB; 214/1 S; 294/67 R
[51] Int. Cl.² ........................................... B66C 1/48
[58] Field of Search.. 294/67 R, 67 A, 67 B, 67 BB, 294/67 D, 67 DA, 67 DB, 81 R, 86 LS, 103 CG; 214/1 QA, 1 QD, 1 QE, 1 S, 1 SW, 10.5

[56] References Cited
UNITED STATES PATENTS

| | | | |
|---|---|---|---|
| 2,281,348 | 4/1942 | Breslav | 294/67 BB |
| 2,284,238 | 5/1942 | Todd | 294/67 BB |
| 2,670,983 | 3/1954 | Breslav | 294/67 BB |
| 2,698,764 | 1/1955 | Holland | 294/67 BB |
| 3,643,935 | 2/1972 | Bell | 214/1 SW X |

Primary Examiner—Evon C. Blunk
Assistant Examiner—Johnny D. Cherry
Attorney, Agent, or Firm—Pearson & Pearson

[57] ABSTRACT

Equipment for handling rigid sheet material such as glass comprises a framework which is rotatably mounted on a depending support arm for motion about an axis arranged generally perpendicularly to a plane of support as defined by the framework. The centre of gravity of the framework generally coincides with the pivot axis thereof, and the framework is arranged to support the load in an off-centre position such that the centre of gravity of the load is spaced from the pivot axis of the framework to give automatic rotation of the load under the effect of gravity, upon release of a locking means securing the framework and support arm in a predetermined relative angular disposition.

22 Claims, 3 Drawing Figures

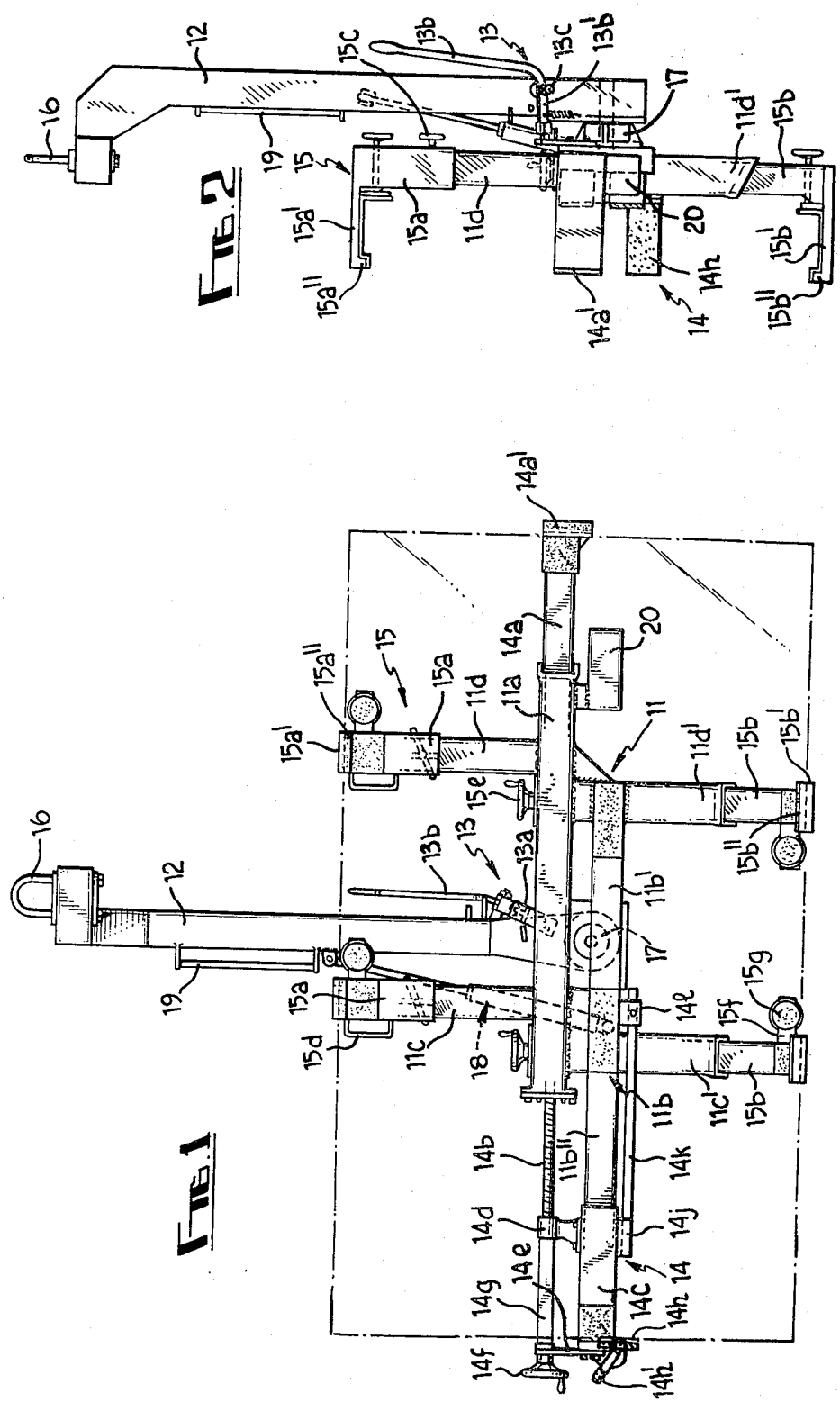

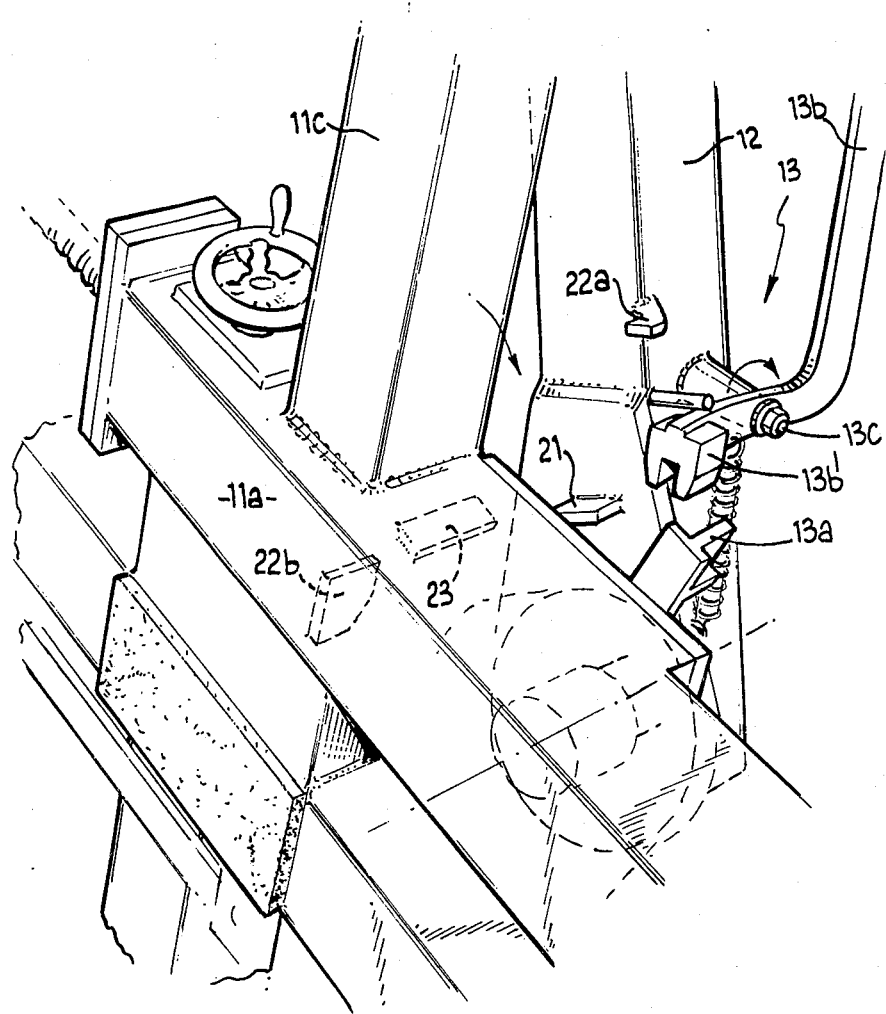

SHEET HANDLING EQUIPMENT

The invention concerns sheet handling equipment and has particular, though by no means exclusive, reference to equipment for handling sheet glass.

In the transportation of rectangular sheets of glass of large size by lorry it is usual to support the sheets on a longitudinal edge thereof in generally vertical disposition. When it is desired to store the glass in a warehouse until required for use, in order to give a minimum floor area space requirement, it is desirable that the sheets be supported on a lateral edge and thus such sheets must be turned through 90° between the carriage thereof on the vehicle and the storage thereof on a suitable stillage in a warehouse.

Conventionally the glass, as a plurality of vertically disposed sheets thereof arranged face-to-face on respective longitudinal edges, is lifted from the lorry by suitable lifting means, the disposition of the sheets being generally maintained during transportation to the storage location, and the individual sheets are manhandled to a storage position wherein the sheet is supported on a lateral edge. The transportation and manhandling of the sheets is a time consuming, and hence expensive, operation and, in addition, there is the ever present possibility of breakage with the attendant economic loss and, perhaps more importantly, the risk of injury to the operators concerned.

The primary object of the present invention is to provide equipment whereby the sheets can be lifted from the transport vehicle, moved to the storage location and deposited at such location in a requisite disposition.

According to the present invention, sheet handling equipment for use in lifting a rigid sheet or sheets at a first position wherein each sheet is disposed in generally vertical manner on an edge thereof and depositing the sheet or sheets at a second position on a second and different edge, adjustment of the equipment between the conditions appropriate to the first and second positions being gravity controlled comprises a rigid framework, such framework defining a support plane, a suspension arm connected with and adapted to support the said framework, the arm being generally parallel to the support plane and the framework being rotatable relative to the suspension arm about an axis generally at right angles to the plane of the framework, a first abutment means on the said framework adapted for engagement with the sheet or sheets to be moved at the first edge thereof, and a second abutment means on the framework adapted for engagement with a second edge of the sheet, such second edge being adjacent the said first edge, the abutment means each including elements adapted for engagement with respective edges of the sheet and the second abutment means lying, in relation to the first such means, in a direction opposite to the direction of pivotal motion of the framework under gravity.

According to a preferred feature of the invention, the pivot axis of the framework coincides or substantially coincides with the centre of gravity thereof and either or both of the abutment means is adapted to support the load in an "off-centre" position relative to the pivot axis and a manually actuable lock is provided operable between the suspension arm and framework and adapted, when engaged, to maintain such arm and framework in a predetermined relative angular disposition.

Preferably, the suspension arm has a lifting eye arranged in offset disposition relative to the longitudinal axis of the said arm, the centre of gravity of a load supported on the framework in offset disposition thereon lying directly below the said lifting eye.

The invention also includes the method of handling rigid sheet material comprising the steps of supporting the sheet in generally vertical disposition on a first, horizontally arranged edge thereof, raising the sheet whilst in such disposition and allowing the sheet to rotate, under the effect of gravity, through 90° about an axis generally perpendicular to the plane of the sheet and spaced from the centre of gravity thereof, and depositing the sheet, whilst generally vertically disposed, on a second edge directed at right angles to the said first edge.

The invention will now be described further, by way of example only, with reference to the accompanying drawings which illustrate one embodiment thereof and in which:

FIG. 1 shows a front elevation of equipment constructed in accordance with the present invention;

FIG. 2 is a side elevation of the arrangement shown in FIG. 1; and

FIG. 3 is a perspective view, drawn to a larger scale, of a part of the equipment of FIGS. 1 and 2, and shows the lock means thereof.

Referring now to the drawings, handling equipment for use in lifting sheet glass from a generally vertical disposition upon a transport vehicle and transferring the same to a storage location whereat the glass is to be supported upon an edge different from that upon which the sheet was supported on the vehicle comprises a rigid framework 11 rotatably secured to a suspension arm 12 arranged in a plane generally parallel to that of the framework, a lock means 13 operable between the framework 11 and suspension arm 12 and adapted to hold the same in a predetermined relative angular dispositions about the pivot axis of the framework, and first and second abutment means 14, 15, respectively, extending outwardly from the longitudinal and lateral edges of the framework.

The framework includes two longitudinally extending members 11a, 11b secured together in spaced, parallel disposition, the individual elements of the first abutment means 14 being axially aligned with respective ones of such members 11a, 11b, and two pairs of laterally extending members 11c, 11c', 11d, 11d', the individual members of each such pair being arranged in offset parallel disposition and the pairs themselves being in spaced apart parallel disposition. Longitudinally extending member 11a is of hollow, square cross section and has an element 14a of the first abutment means 14 slidably mounted therein, the said member further including a bearing, not shown, for supporting a feed screw 14b of the abutment means 14, for a purpose hereafter to be made apparent. The longitudinally extending member 11b comprises a body part 11b' of elongate U-shape butt — secured to member 11a, as by welding, and a guide 11b'' extending from the body part in alignment with the bottom of such part and at the opposite end of the framework from that from which the element 14a extends. The guide 11b'' receives an element 14c of the first abutment means into sliding engagement therewith.

Corresponding members 11c, 11d of the laterally extending members are secured to member 11a generally at right angles thereto, whilst corresponding members 11c', 11d' are similarly secured to the body part 11b', member 11c, 11d being at the opposite side of the framework from the members 11c', 11d'. The members 11c, 11c', 11d, 11d' are all of square cross-section, members 11c, 11d receiving respective members 15a of the second abutment means in sliding engagement thereon, whilst members 11c', 11d' receive respective members 15b in sliding telescoping engagement therewith, all as will hereafter be made apparent.

One end of the suspension arm 12 is secured to the framework 11 through a pivot connection 17, whilst the other end of the arm carries an eye 16 for engagement by a lifting hook, not shown, the eye being offset with respect to the longitudinal axis of the suspension arm and, as seen in FIG. 1, directly above the centre of gravity of the load. An hydraulic piston and cylinder unit 18 is secured to and extends between the framework 11 and the suspension arm 12, such unit 18 serving to dampen pivotal motion of the framework relative to the suspension arm in the clockwise direction, as seen in the drawing, on release of the lock means 13.

The lock means 13 (see particularly FIG. 3) comprises a lug 13a secured to the member 11a, to extend upwardly and rearwardly thereof, and a cranked lever 13b mounted on the side of the suspension arm for motion about a pin 13c secured to such arm. The nose 13b' of the lever has a detent at the underside thereof for engagement with the lug 13a. As is apparent from the drawing, the pivot axis of the cranked lever 13b is inclined relative to the axis of member 11a and is generally tangential to a notional circle, concentric with the pivot connection 17. A second lug 23 is provided on element 11a, such second lug being angularly spaced from lug 13a by approximately 90° and serving to cooperate with the detent at the underside of nose 13b'. Cooperation between lug 13a and the detent on nose 13b' will lock the framework and suspension arm in a first relative angular disposition, whilst cooperation of lug 23 and the detent will hold the parts in a second relative angular disposition at right angles to the first such position.

Element 14a of the first abutment means 14 is of square cross-section and is a free sliding fit within member 11a, the inner end of the element carrying a nut, not shown, screw-threadedly engaged with the feed-screw 14b and the outer end of the element terminating in a shoe 14a' of generally L-shaped cross-section, the said shoe extending coaxially with and then forwardly of the element 14a.

The feed screw 14b is supported in a bearing disposed within member 11a, such screw being rotatably within the bearing but fixed against axial movement relative thereto. The screw-thread as applied to the feed-screw has portions of opposite hand at the two sides of the bearing, one such portion being engaged with the nut carried by the member 14a and the other portion being engaged with a nut non-rotatably secured to a bracket 14d secured to the element 14c. The outer end of the element 14c supports a second bracket 14e arranged in spaced parallel disposition relative to bracket 14d, the bracket 14e having a sleeve 14g of square cross-section rotatable in a bearing therein, the sleeve carrying a hand-wheel 14f at the outer end thereof and the other end being connected with the feed-screw by means of a square nut secured to the end of the feed-screw and slidable axially of and within the sleeve. Rotation of the hand-wheel 14f rotates the sleeve 14g and this, in turn, rotates the feed-screw. As the element 14c moves towards or away from element 14a, the sleeve moves axially of the feed-screw and in telescoping engagement therewith.

Element 14c is of square cross-section and is a free sliding fit on guide 11b'', the outer end of such element having a shoe 14h pivotally secured thereto, such shoe being displaceable about an axis lying in a plane generally parallel to the plane of the framework and inclined relative to the axis of member 14c and being movable automatically by co-operation between an extension 14h' to the shoe 14h and a bar 19 secured to the side of the suspension arm on relative pivotal motion of a predetermined extent between the framework and suspension arm.

A block 14j is secured to the underside of member 14c, and rod 14k being secured to the block 14j and being slidably received in a block 14l secured to the underside of the body part 11b'.

The elements 15a of the second abutment means are of square cross-section, each such element being freely slidable on the upper end of a respective one of members 11c, 11d and being lockable axially thereon by screw means 15c (FIG. 2) engaged with the elements and members. The upper end of each element 15a terminates in a shoe 15a' which extends forwardly (as seen in FIG. 1 of the drawing) from the element, there being a lip 15a'' at the forward end of the shoe. A handle 15d is provided on each element 15a to facilitate the manual adjustment thereof. The elements 15b are likewise each of square cross-section and are slidable within respective members 11c', 11d', the elements 15b being adjustable axially of the said member by respective screw means 15e arranged in alignment with the elements and extending transversely through the longitudinal members 11a, 11b. At its lower end, each element 15b terminates in a shoe 15b', the shoe having a lip 15b'' at its forward end arranged coplanar with the lips 15a'' of the shoes 15a'. A bracket 15f is provided on each element 15 b, such brackets having respective screws engaged there with and there being a pad 15g applied to each screw at the forward end thereof.

In the preferred structure, the pivot axis of the framework and the centre of gravity of such framework are coincident, whilst the relative positions of the shoe 14a' and the shoe 14h are such that the centre of gravity of a load supported by the framework is offset in relation to such pivot axis, being directly beneath lifting eye 16 with the result that, upon release of the lock means 13, the framework, together with the load supported thereby, will automatically rotate in a clockwise direction (as seen in FIG. 1). In order to ensure that the centre of gravity of the framework and the pivot axis of the framework are coincident, and thus the resultant centre of gravity of such framework and any load located thereon is at a requisite position relative to the pivot axis, a balance weight 20 is provided on the framework.

In use of the equipment, the shoes 14a' and 14h of the first abutment means are positioned outwardly of the ends of the sheets as they exist in vertical disposition on the lorry, and the lower and upper shoes 15b', 15a' are located outwardly of the corresponding edges of the sheets. The sheets are located in the requisite asymmetrical disposition upon the framework, as regards the longitudinal direction of the sheets relative to the pivot axis, by actuation of the hand-wheel 14f, such actuation moving the opposed shoes 14a' and 14h simultaneously towards the adjacent edges of the sheets and displacing the sheets in the longitudinal direction thereof until the same assume a required position upon the framework with shoes 14a', 14h each in abutment with a respective edge. With the sheets thus disposed, the upper and lower shoes are adjusted, the former by sliding adjusting of the element 15a on the related member 11c and the latter by actuation of the screw means 15e. Ideally, the upper and lower shoes will be so positioned that the centre of gravity of the load will lie directly below the lifting eye 16 and on a line passing through the pivot axis and inclined at 45° to the horizontal.

After lifting the framework, the latter and the sheets thereon being tilted forwardly and downwardly slightly, and transferring the same to the unloading location, the lock means 13 is disengaged and the framework automatically pivots in a clockwise direction (as seen in FIG. 1) against the damping resistance of the piston and cylinder unit 18. As the framework reaches the limit of its intended pivotal movement, as determined by the engagement of co-operating stop means 22a, 22b on the suspension arm and framework respectively, the extension 14h'' abuts the bar 19 and causes the shoe 14h to pivot away from engagement with the sheets. After pivotal motion of the framework through 90° and engagement of the co-operating stops, the centre of gravity of the load will again be positioned directly below the lifting eye, and thus the framework and load will be in a stable condition. The pivotal motion through an angle of 90° will ensure that the lateral edge of the sheet, upon which edge the glass is to be supported on a stillage, will be accurately horizontal and the engagement of the sheet with the stillage can be effected easily and without the risk of breakage which would be present if the said edge were other than accurately horizontal.

The equipment is again readied for use by swinging the framework in an anticlockwise direction until cooperating stop means on the frame and suspension arm prevent further movement and re-engaging the lock means.

By virtue of the construction of the equipment, return of the framework to its initial position, as determined by the abutment of stop 21 with the lug 13a, can be effected manually by a single operator after release of the appropriate lock means 13b', 23, and without the need for any mechanical or equivalent means. There is no restraint to the return motion of the framework arising from the damping means 18 in that such means operates in one direction only and includes a by-pass valve to preclude restraint when the framework is pivoted in the other direction.

The invention is not restricted to the exact features of the embodiment disclosed since alternatives will readily present themselves to one skilled in the art. Thus, for example, whilst the centre of gravity of the load will preferably lie on a line inclined at 45° to the horizontal and passing through the pivot axis and at a position on such line directly below the lifting eye, the centre of gravity of the load may be at any position at or above the level of the pivot axis and vertically below or substantially vertical below (as seen in FIG. 1) the lifting eye.

Furthermore, whilst it is preferred that opposed abutment means 14a, 14c be provided, each having a respective shoe thereon for engagement with an edge of the glass sheet, it may be found adequate for there to be only a single abutment means at the same side of the pivot axis of the framework, in relation to the suspension arm, as the centre of gravity of any load applied to the framework. Thus, in the case of the arrangement shown in FIG. 1, abutment means 14c can be omitted since the centre of gravity of the load is to the right and above the level of the pivot axis.

What I claim is:

1. Sheet handling equipment for use in lifting a load consisting of a rigid sheet, or sheets, at a first position, whereat each said sheet is disposed in generally vertical manner on a first edge thereof, rotating the load and depositing the same at a second position on a second and different edge, the said equipment comprising a rigid framework, such framework defining a generally vertical support plane, a suspension arm connected with and adapted to support the said framework, the arm being generally parallel to the support plane and the framework being rotatable relative to the suspension arm, in a plane adjacent to such arm, about an axis generally at right angles to the support plane, a first abutment means on the said framework adapted for engagement with the sheet or sheets to be moved at the first edge thereof, and a second abutment means on the framework adapted for engagement with a second edge of the sheet, such second edge being adjacent the said first edge, the abutment means each including elements adapted for engagement with respective edges of the sheet; means for rotating said load in said support plane on said pivot axis in a predetermined angular direction under the influence of gravity, and the second abutment means lying, in relation to the first such means, on the same side of said pivot axis as said predetermined angular direction.

2. Sheet handling equipment as claimed in claim 1 wherein the suspension arm has a lifting eye arranged in offset disposition relative to the longitudinal axis of the lifting arm.

3. Sheet handling equipment as claimed in claim 2 wherein the second abutment means is adapted to position a load on the framework with the centre of gravity of the load directly below the lifting eye of the suspension arm.

4. Sheet handling equipment as claimed in claim 3, wherein the center of gravity of the load lies on a line passing through the pivot axis and arranged at an angle of 45° to the longitudinal axis of the suspension arm and at that side of the pivot axis closer to the lifting eye.

5. Sheet handling equipment as claimed in claim 1, wherein the pivot axis of the framework coincides or substantially coincides with the centre of gravity thereof and at least one of said first and second abutment means is adapted to support the load in an "off-centre" position relative to the pivot axis.

6. Sheet handling equipment as claimed in claim 1 wherein the second abutment means is adapted to engage with said second edge, and with an edge opposed to said second edge of the sheet, the elements engageable with the said edges being simultaneously adjustable in relation to each other.

7. Sheet handling equipment as claimed in claim 6, wherein the second abutment means comprise elements arranged in telescoped engagement with the framework and in opposed disposition, the said elements being inter-connected for simultaneous displacement in opposite directions by screw-means supported on the framework.

8. Sheet handling equipment as claimed in claim 7, wherein the elements are arranged in off-set disposition, the screw means being arranged coaxially with one such element and being connected with the other element by bracket means.

9. Sheet handling equipment as claimed in claim 8, wherein the screw means includes an axially fixed screw-threaded rod rotatably mounted on the framework, the said rod having screw portions of opposite hand, a respective nut for each abutment element, the nuts being non-rotatably mounted, and an actuator adapted to effect rotation of the rod and shift of the nuts axially thereof.

10. Sheet handling equipment as claimed in claim 7, wherein each element carries a respective shoe for engagement with a sheet edge, one such shoe being pivotally mounted on the related element.

11. Sheet handling equipment as claimed in claim 10, wherein the pivotally mounted shoe is adapted for displacement to an inoperative position automatically upon the rotation of the framework on the support arm to a predetermined position.

12. Sheet handling equipment as claimed in claim 11, including abutment means on the support arm for cooperation with the pivotally mounted shoe.

13. Sheet handling equipment as claimed in claim 1, wherein the first abutment means is adapted for engagement with the sheet or sheets at the said first edge and at an edge opposed to the said first edge.

14. Sheet handling equipment as claimed in claim 13 wherein the first abutment means includes elements engageable with the first and with the opposed edge which are adapted for simultaneous adjustment relative to each other.

15. Sheet handling equipment as claimed in claim 1, including a manually actuable lock operable between the suspension arm and framework and adapted, when engaged, to maintain such arm and framework in a predetermined relative angular disposition.

16. Sheet handling equipment as claimed in claim 1, including fluid piston and cylinder means operable between the support arm and framework and adapted to damp rotational movement there-between.

17. Sheet handling equipment as claimed in claim 1, wherein the first abutment means is adjustably supported on the framework.

18. Sheet handling equipment as claimed in claim 17, including screw means for the manual adjustment of the first abutment means.

19. The method of handling rigid sheet material comprising the steps of supporting the sheet in generally vertical disposition on a first, horizontally arranged edge thereof, raising the sheet whilst in such disposition and allowing the sheet to rotate, under the effect of gravity, through 90° about an axis generally perpendicular to the plane of the sheet and spaced from the centre of gravity thereof, and depositing the sheet whilst generally vertically disposed, on a second edge directed at right angles to the said first edge.

20. The method as claimed in claim 19 wherein the sheet is supported on a framework suspended from a lifting point, the centre of gravity of the sheet being directly beneath the lifting point both before and after rotation of the sheet.

21. In a sheet lifting grapple the combination of:
a depending support arm having a lifting eye at the upper end and having a lower end;
a framework, rotatably mounted to revolve in a vertical plane on a horizontal pivot axis at said lower end;
a pair of longitudinally movable, opposed, abutment means, and a pair of laterally movable, opposed, abutment means, on said framework for engaging on the opposite longitudinal and lateral edges of an upstanding load of rigid sheets and supporting the same;
means on said framework for supporting said load in an off-centre position, with the centre of gravity of the load spaced from the pivot axis of said framework for causing said load to tend to rotate 90° in said vertical plane automatically under the effect of gravity; and
releasable locking means for securing said framework and its load against such rotation until desired.

22. A grapple as specified in claim 21 wherein:
said lifting eye is offset at the upper end of said support arm
and said load supporting means on said framework is adjusted to locate the centre of gravity of said load of sheets to lie directly below said lifting eye.

* * * * *